US011577380B2

(12) United States Patent
Duthaler et al.

(10) Patent No.: US 11,577,380 B2
(45) Date of Patent: Feb. 14, 2023

(54) SYSTEMS AND METHODS FOR PRIVACY MANAGEMENT IN AN AUTONOMOUS MOBILE ROBOT

(71) Applicant: iRobot Corporation, Bedford, MA (US)

(72) Inventors: Gregg Duthaler, Needham, MA (US); Vincent Edward Colella, Wilmington, MA (US)

(73) Assignee: iRobot Corporation, Bedford, MA (US)

( * ) Notice: Subject to any disclaimer, the term of this patent is extended or adjusted under 35 U.S.C. 154(b) by 262 days.

(21) Appl. No.: 17/146,563

(22) Filed: Jan. 12, 2021

(65) Prior Publication Data
US 2022/0219311 A1 Jul. 14, 2022

(51) Int. Cl.
 B25J 19/02 (2006.01)
 B25J 9/00 (2006.01)
 G06F 21/62 (2013.01)
 B25J 11/00 (2006.01)

(52) U.S. Cl.
 CPC ......... B25J 9/0003 (2013.01); B25J 11/0085 (2013.01); B25J 19/023 (2013.01); G06F 21/6245 (2013.01)

(58) Field of Classification Search
 CPC .. A47L 9/2894; A47L 9/2857; A47L 11/4011; A47L 2201/00; B25J 9/0003; B25J 11/0085; B25J 19/023; G06F 21/6245
 See application file for complete search history.

(56) References Cited

U.S. PATENT DOCUMENTS

| | | | | |
|---|---|---|---|---|
| 8,380,350 B2 * | 2/2013 | Ozick | ................... | A47L 9/0477 700/250 |
| 8,606,401 B2 * | 12/2013 | Ozick | ...................... | A47L 9/12 700/258 |
| 8,954,192 B2 * | 2/2015 | Ozick | ................... | A47L 9/0488 700/258 |
| 9,149,170 B2 * | 10/2015 | Ozick | ................ | B60L 15/2036 |

(Continued)

FOREIGN PATENT DOCUMENTS

WO    WO-2022154858 A1    7/2022

OTHER PUBLICATIONS

Mohamed et al., SMASheD: Sniffing and Manipulating Android Sensor Data for Offensive Purposes, 2016, IEEE, p. 901-913 (Year: 2016).*

(Continued)

Primary Examiner — Mcdieunel Marc
(74) Attorney, Agent, or Firm — Schwegman Lundberg & Woessner, P.A.

(57) ABSTRACT

A method of operating a mobile cleaning robot can include receiving a privacy mode setting from a user interface, where the privacy mode setting is based on a user selection between at least two different privacy mode settings for determining whether to operate the mobile cleaning robot in an image-capture-restricted mode. An image stream of an image capture device of the mobile cleaning robot is permitted in an absence of a user-selection of a more restrictive one of the privacy settings. At least a portion of the image stream is restricted or disabled based at least in part on a user-selection of a more restrictive one of the privacy settings.

20 Claims, 11 Drawing Sheets

(56) References Cited

U.S. PATENT DOCUMENTS

| | | | |
|---|---|---|---|
| 9,446,510 | B2 | 9/2016 | Vu et al. |
| 10,471,611 | B2 | 11/2019 | Dooley et al. |
| 11,064,856 | B1 * | 7/2021 | Afrouzi .................. A47L 9/22 |
| 2017/0215666 | A1 * | 8/2017 | Won ...................... B25J 9/0003 |
| 2017/0361468 | A1 | 12/2017 | Cheuvront et al. |
| 2018/0154514 | A1 | 6/2018 | Angle et al. |
| 2020/0272154 | A1 | 8/2020 | Bearup et al. |

OTHER PUBLICATIONS

Rueben et al., Evaluation of physical marker interfaces for protecting visual privacy from mobile robots, 2016, IEEE, p. 787-794 (Year: 2016).*

Schaub et al., Context-Adaptive Privacy: Leveraging Context Awareness to Support Privacy Decision Making, 2015, IEEE, p. 34-43 (Year: 2015).*

Krupp et al., SPE: Security and Privacy Enhancement Framework for Mobile Devices, 2015, IEEE, p. 433-446 (Year: 2015).*

"International Application Serial No. PCT US2021 059906, International Search Report dated Feb. 7, 2022", 2 pgs.

"International Application Serial No. PCT US2021 059906, Written Opinion dated Feb. 7, 2022", 5 pgs.

* cited by examiner

SYSTEMS AND METHODS FOR PRIVACY MANAGEMENT IN AN AUTONOMOUS MOBILE ROBOT

BACKGROUND

Autonomous mobile robots include autonomous cleaning robots that can autonomously perform cleaning tasks within an environment, such as a home. Many kinds of cleaning robots are autonomous to some degree and in different ways. The autonomy of mobile cleaning robots can be enabled by the use of a controller and multiple sensors mounted on the robot. In some examples, a camera can be included on the robot to capture video in the environment for analysis by the controller to control operation of the mobile cleaning robot within the environment.

SUMMARY

An optical device, such as a digital camera can be incorporated into a mobile cleaning robot, such as by securing the camera to an outer portion of the mobile cleaning robot in a forward-facing (with respect to a direction of forward travel of the robot) orientation. The camera can provide many helpful features for controlling the robot, such as obstacle detection and avoidance. Because it may be desired to include a camera to improve operation of some aspects of the robot (such as obstacle detection), it may be economical to use the camera for additional functions (such as docking and odometry) to allow for the removal of other sensors from the robot.

However, use of a camera in a home or an office of a user raises privacy concerns of that user. A user may feel uncomfortable with images being collected while the user is in the bathroom, or working in an office, and additionally, though images are rarely or never uploaded to the cloud (and only then with user permission), a user may be concerned that un unauthorized party may gain access to the user's account and view the images. Therefore, the user may feel more comfortable with the robot's front-facing camera (or image capture device) if they are able to create a privacy mode where the camera cannot produce an image stream.

The devices, systems, and methods of this application can help to address these issues by providing a user with options for selecting a privacy mode, such as a privacy location, schedule, or other rule that requires the imaging stream to be disabled or restricted. For example, a user may set a privacy rule or setting to disable the imaging stream of the image capture device in a bedroom of the user. Also, a user may create a privacy setting to disable the image capture device in an office. The robot can also be configured to navigate through the environment using other sensors to allow the robot to continue performing cleaning operations even when a privacy mode is enabled.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
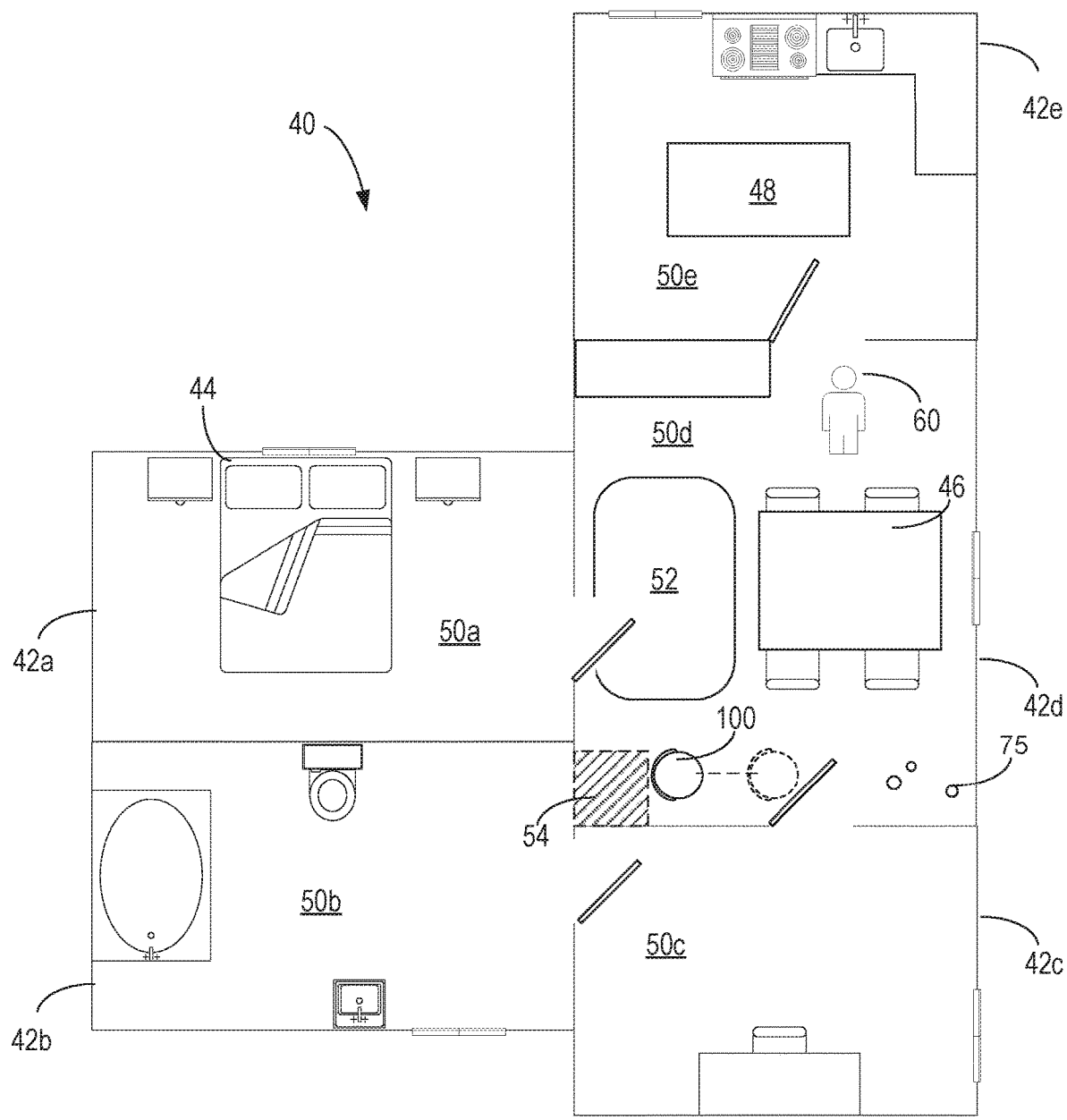
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Components of the Robot

Figure 2A:
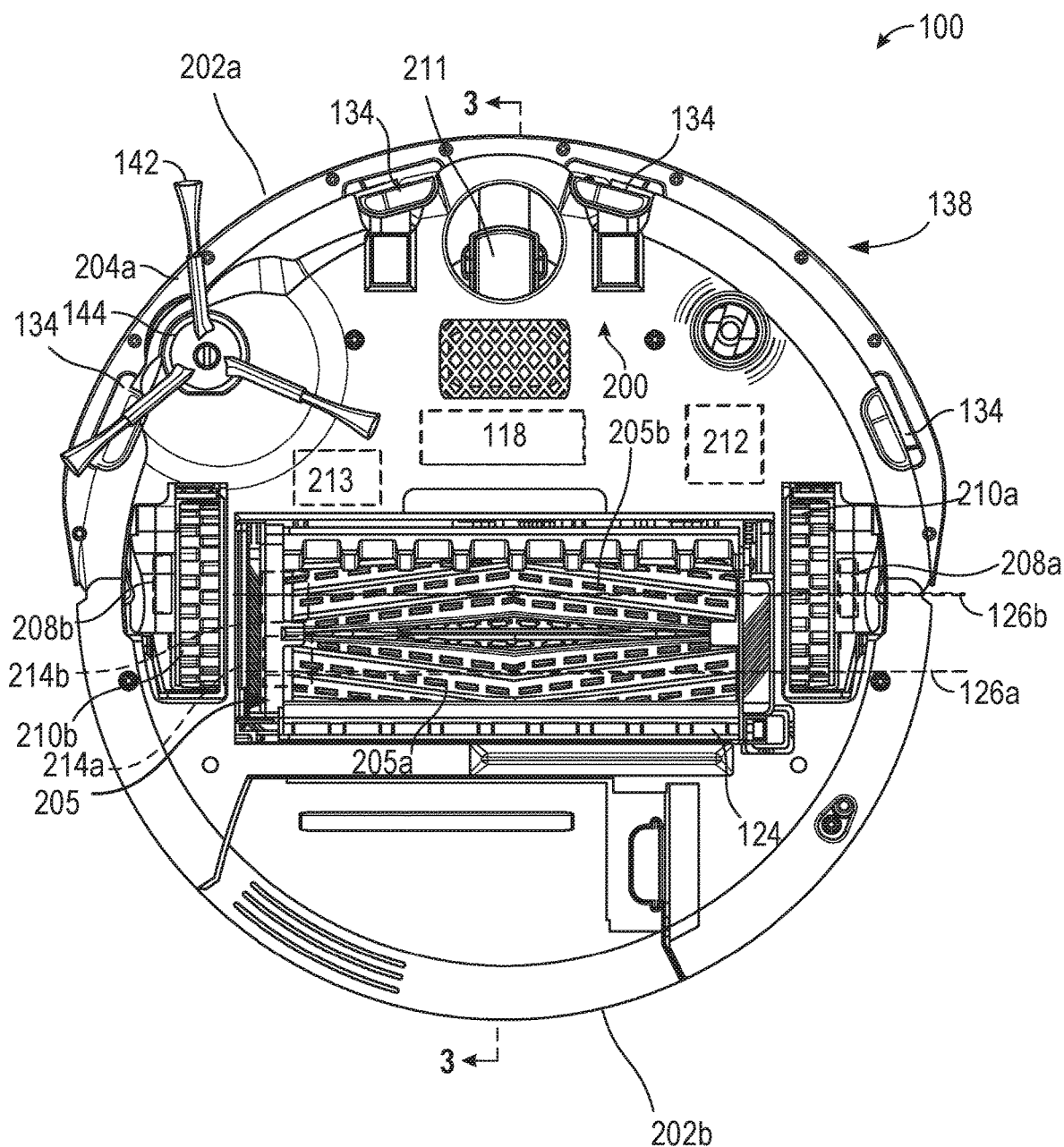
FIG. 2A illustrates a bottom view of a mobile cleaning robot.
Figure 2B:
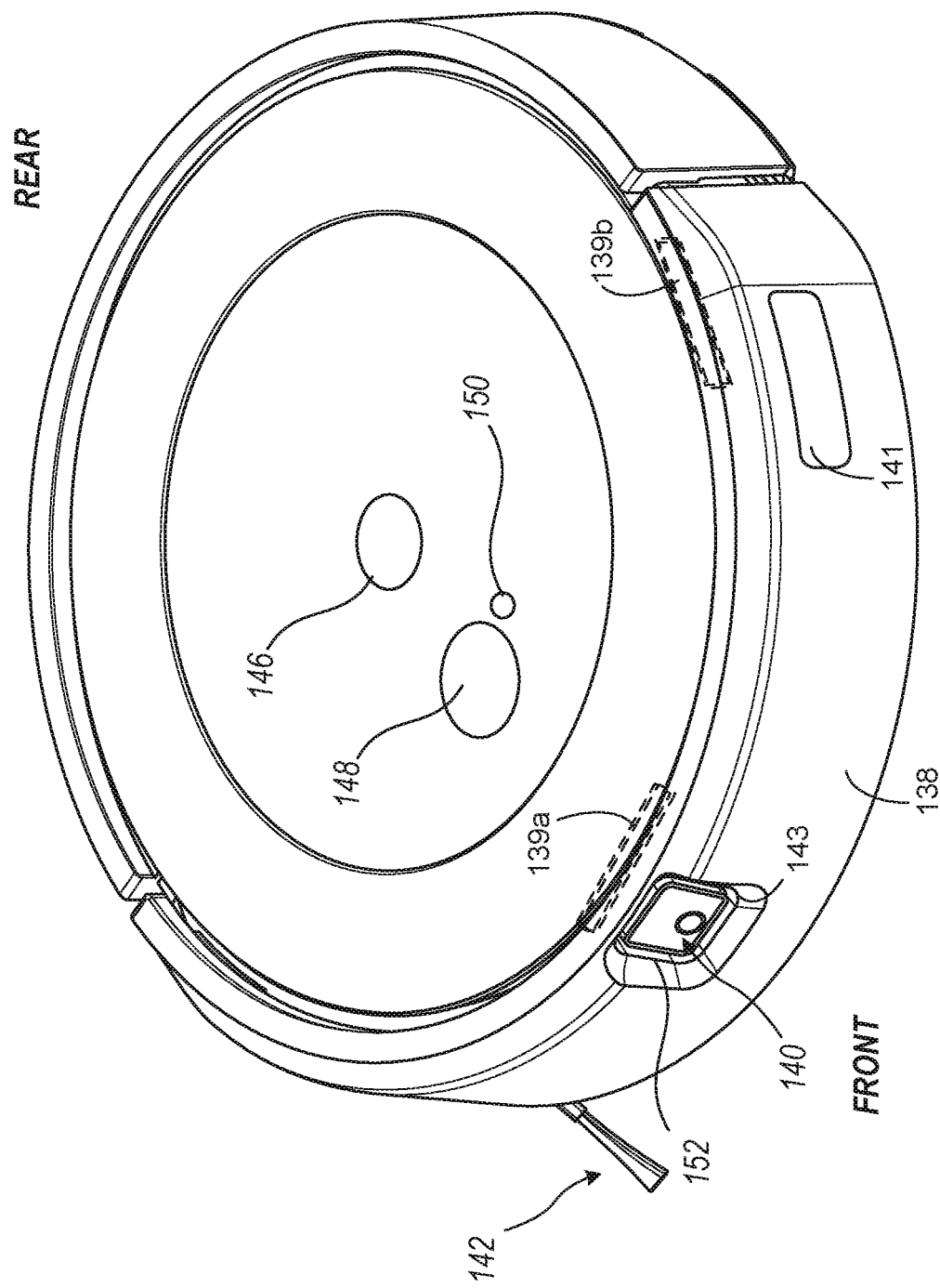
FIG. 2B illustrates an isometric view of a mobile cleaning robot.
Figure 3:
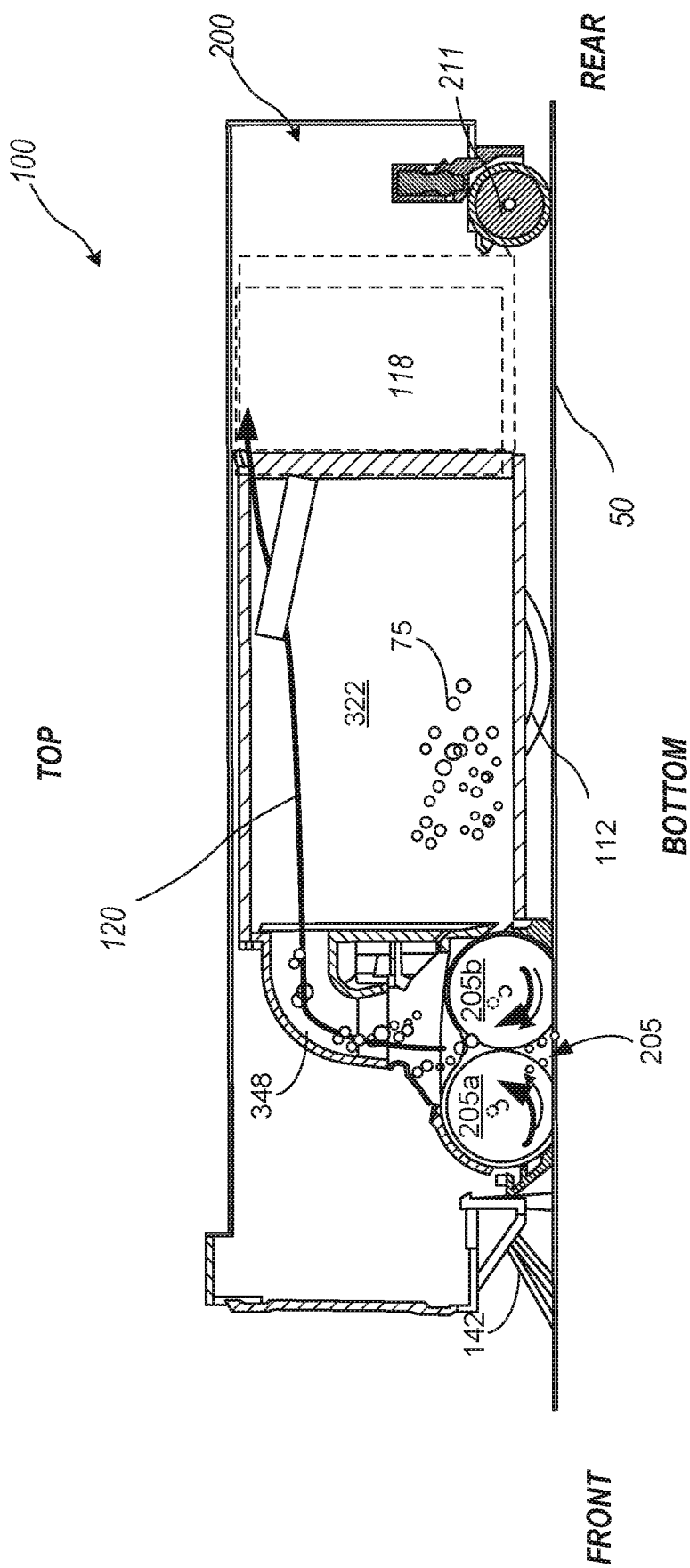
FIG. 3 illustrates a cross-section view across indicators 3-3 of FIG. 2A of a mobile cleaning robot.

FIG. 2A illustrates a bottom view of the mobile cleaning robot 100. FIG. 2B illustrates a bottom view of the mobile cleaning robot 100. FIG. 3 illustrates a cross-section view across indicators 3-3 of FIG. 2A of the mobile cleaning robot 100. FIG. 3 also shows orientation indicators Bottom, Top, Front, and Rear. FIGS. 2A-3 are discussed together below.

The cleaning robot 100 can be an autonomous cleaning robot that autonomously traverses the floor surface 50 while ingesting the debris 75 from different parts of the floor surface 50. As depicted in FIGS. 2A and 3, the robot 100 includes a body 200 movable across the floor surface 50. The body 200 can include multiple connected structures to which movable components of the cleaning robot 100 are mounted. The connected structures can include, for example, an outer housing to cover internal components of the cleaning robot 100, a chassis to which drive wheels 210a and 210b and the cleaning rollers 205a and 205b (of a cleaning assembly 205) are mounted, a bumper 138 mounted to the outer housing, etc.

As shown in FIG. 2A, the body 200 includes a front portion 202a that has a substantially semicircular shape and a rear portion 202b that has a substantially semicircular shape. As shown in FIG. 2A, the robot 100 can include a drive system including actuators 208a and 208b, e.g., motors, operable with drive wheels 210a and 210b. The actuators 208a and 208b can be mounted in the body 200 and can be operably connected to the drive wheels 210a and 210b, which are rotatably mounted to the body 200. The drive wheels 210a and 210b support the body 200 above the floor surface 50. The actuators 208a and 208b, when driven, can rotate the drive wheels 210a and 210b to enable the robot 100 to autonomously move across the floor surface 50.

The controller (or processor) 212 can be located within the housing and can be a programmable controller, such as a single or multi-board computer, a direct digital controller (DDC), a programmable logic controller (PLC), or the like. In other examples the controller 212 can be any computing device, such as a handheld computer, for example, a smart phone, a tablet, a laptop, a desktop computer, or any other computing device including a processor, memory, and communication capabilities. The memory 213 can be one or more types of memory, such as volatile or non-volatile memory, read-only memory (ROM), random-access memory (RAM), magnetic disk storage media, optical storage media, flash-memory devices, and other storage devices and media. The memory 213 can be located within the housing 200, connected to the controller 212 and accessible by the controller 212.

The controller 212 can operate the actuators 208a and 208b to autonomously navigate the robot 100 about the floor surface 50 during a cleaning operation. The actuators 208a and 208b are operable to drive the robot 100 in a forward drive direction, in a backwards direction, and to turn the robot 100. The robot 100 can include a caster wheel 211 that supports the body 200 above the floor surface 50. The caster wheel 211 can support the rear portion 202b of the body 200 above the floor surface 50, and the drive wheels 210a and 210b support the front portion 202a of the body 200 above the floor surface 50.

As shown in FIG. 3, a vacuum assembly 118 can be carried within the body 200 of the robot 100, e.g., in the front portion 202a of the body 200. The controller 212 can operate the vacuum assembly 118 to generate an airflow that flows through the air gap near the cleaning rollers 205, through the body 200, and out of the body 200. The vacuum assembly 118 can include, for example, an impeller that generates the airflow when rotated. The airflow and the cleaning rollers 205, when rotated, cooperate to ingest debris 75 into the robot 100. A cleaning bin 322 mounted in the body 200 contains the debris 75 ingested by the robot 100, and a filter in the body 200 separates the debris 75 from the airflow before the airflow 120 enters the vacuum assembly 118 and is exhausted out of the body 200. In this regard, the debris 75 is captured in both the cleaning bin 322 and the filter before the airflow 120 is exhausted from the body 200.

The cleaning rollers 205a and 205b can operably connected to actuators 214a and 214b, e.g., motors, respectively. The cleaning head 205 and the cleaning rollers 205a and 205b can positioned forward of the cleaning bin 322. The cleaning rollers 205a and 205b can be mounted to a housing 124 of the cleaning head 205 and mounted, e.g., indirectly or directly, to the body 200 of the robot 100. In particular, the cleaning rollers 205a and 205b are mounted to an underside of the body 200 so that the cleaning rollers 205a and 205b engage debris 75 on the floor surface 50 during the cleaning operation when the underside faces the floor surface 50.

The housing 124 of the cleaning head 205 can be mounted to the body 200 of the robot 100. In this regard, the cleaning rollers 205a and 205b are also mounted to the body 200 of the robot 100, e.g., indirectly mounted to the body 200 through the housing 124. Alternatively, or additionally, the cleaning head 205 is a removable assembly of the robot 100 in which the housing 124 with the cleaning rollers 205a and 205b mounted therein is removably mounted to the body 200 of the robot 100. The housing 124 and the cleaning rollers 205a and 205b are removable from the body 200 as a unit so that the cleaning head 205 is easily interchangeable with a replacement cleaning head 205.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50.

Cliff sensors 134 (shown in FIG. 2A) can be located along a bottom portion of the housing 200. Each of the cliff sensors 134 can be an optical sensor that can be configured to detect a presence or absence of an object below the optical sensor, such as the floor surface 50. The cliff sensors 134 can be connected to the controller 212. A bumper 138 can be removably secured to the body 200 and can be movable relative to body 200 while mounted thereto. In some examples, the bumper 138 form part of the body 200. The bump sensors 139a and 139b (the bump sensors 139) can be connected to the body 200 and engageable or configured to interact with the bumper 138. The bump sensors 139 can include break beam sensors, capacitive sensors, switches, or other sensors that can detect contact between the robot 100, i.e., the bumper 138, and objects in the environment 40. The bump sensors 139 can be in communication with the controller 212.

An image capture device 140 can be a camera connected to the body 200 and can extend through the bumper 138 of the robot 100, such as through an opening 143 of the bumper 138. The image capture device 140 can be a camera, such as a front-facing camera, configured to generate a signal based on imagery of the environment 40 of the robot 100 as the robot 100 moves about the floor surface 50. The image capture device 140 can transmit the signal to the controller 212 for use for navigation and cleaning routines.

Obstacle following sensors 141 (shown in FIG. 2B) can include an optical sensor facing outward from the bumper 138 and that can be configured to detect the presence or the absence of an object adjacent to a side of the body 200. The obstacle following sensor 141 can emit an optical beam horizontally in a direction perpendicular (or nearly perpendicular) to the forward drive direction of the robot 100. The optical emitter can emit an optical beam outward from the robot 100, e.g., outward in a horizontal direction, and the optical detector detects a reflection of the optical beam that reflects off an object near the robot 100. The robot 100, e.g., using the controller 212, can determine a time of flight of the optical beam and thereby determine a distance between the optical detector and the object, and hence a distance between the robot 100 and the object.

A side brush 142 can be connected to an underside of the robot 100 and can be connected to a motor 144 operable to rotate the side brush 142 with respect to the body 200 of the robot 100. The side brush 142 can be configured to engage debris to move the debris toward the cleaning assembly 205 or away from edges of the environment 40. The motor 144 configured to drive the side brush 142 can be in communication with the controller 112. The brush 142 can rotate about a non-horizontal axis, e.g., an axis forming an angle between 75 degrees and 90 degrees with the floor surface 50. The non-horizontal axis, for example, can form an angle between 75 degrees and 90 degrees with the longitudinal axes 126a and 126b of the rollers 205a and 205b.

The brush 142 can be a side brush laterally offset from a center of the robot 100 such that the brush 142 can extend beyond an outer perimeter of the body 200 of the robot 100. Similarly, the brush 142 can also be forwardly offset of a center of the robot 100 such that the brush 142 also extends beyond the bumper 138.

The robot 100 can also include a button 146 (or interface) that can be a user-operable interface configured to provide commands to the robot, such as to pause a mission, power on, power off, or return to a docking station. The robot 100 can also include a privacy button 148 (or interface) that can be a user-operable interface configured to provide commands to the robot, such as to disable or restrict use of the camera 140. For example, pressing the privacy button 148 can cut power to the camera 140 or can operate a shutter 152 to close or open. An indicator 150 can optionally be included and can be lit to indicate when the camera 140 is operating. Additional privacy controls and options are discussed in further detail below with respect to FIGS. 4A-6.

Operation of the Robot

In operation of some examples, the robot 100 can be propelled in a forward drive direction or a rearward drive direction. The robot 100 can also be propelled such that the robot 100 turns in place or turns while moving in the forward drive direction or the rearward drive direction.

When the controller 212 causes the robot 100 to perform a mission, the controller 212 can operate the motors 208 to drive the drive wheels 210 and propel the robot 100 along the floor surface 50. In addition, the controller 212 can operate the motors 214 to cause the rollers 205a and 205b to rotate, can operate the motor 144 to cause the brush 142 to rotate, and can operate the motor of the vacuum system 118 to generate airflow. The controller 212 can execute software stored on the memory 213 to cause the robot 100 to perform various navigational and cleaning behaviors by operating the various motors of the robot 100.

The various sensors of the robot 100 can be used to help the robot navigate and clean within the environment 40. For example, the cliff sensors 134 can detect obstacles such as drop-offs and cliffs below portions of the robot 100 where the cliff sensors 134 are disposed. The cliff sensors 134 can transmit signals to the controller 212 so that the controller 212 can redirect the robot 100 based on signals from the cliff sensors 134.

In some examples, a bump sensor 139a can be used to detect movement of the bumper 138 along a fore-aft axis of the robot 100. A bump sensor 139b can also be used to detect movement of the bumper 138 along one or more sides of the robot 100. The bump sensors 139 can transmit signals to the controller 212 so that the controller 212 can redirect the robot 100 based on signals from the bump sensors 139.

The image capture device 140 can be configured to generate a signal based on imagery of the environment 40 of the robot 100 as the robot 100 moves about the floor surface 50. The image capture device 140 can transmit such a signal to the controller 212. The image capture device 140 can be angled in an upward direction, e.g., angled between 5 degrees and 45 degrees from the floor surface 50 about which the robot 100 navigates. The image capture device 140, when angled upward, can capture images of wall surfaces of the environment so that features corresponding to objects on the wall surfaces can be used for localization.

In some examples, the obstacle following sensors 141 can detect detectable objects, including obstacles such as furniture, walls, persons, and other objects in the environment of the robot 100. In some implementations, the sensor system can include an obstacle following sensor along a side surface, and the obstacle following sensor can detect the presence or the absence an object adjacent to the side surface. The one or more obstacle following sensors 141 can also serve as obstacle detection sensors, similar to the proximity sensors described herein.

The robot 100 can also include sensors for tracking a distance travelled by the robot 100. For example, the sensor system can include encoders associated with the motors 208 for the drive wheels 210, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 212 can use data collected by the sensors of the sensor system to control navigational behaviors of the robot 100 during the mission. For example, the controller 212 can use the sensor data collected by obstacle detection sensors of the robot 100, (the cliff sensors 134, the bump sensors 139, and the image capture device 140) to enable the robot 100 to avoid obstacles within the environment of the robot 100 during the mission.

The sensor data can also be used by the controller 212 for simultaneous localization and mapping (SLAM) techniques in which the controller 212 extracts features of the environment represented by the sensor data and constructs a map of the floor surface 50 of the environment. The sensor data collected by the image capture device 140 can be used for techniques such as vision-based SLAM (VSLAM) in which the controller 212 extracts visual features corresponding to objects in the environment 40 and constructs the map using these visual features. As the controller 212 directs the robot 100 about the floor surface 50 during the mission, the controller 212 can use SLAM techniques to determine a location of the robot 100 within the map by detecting features represented in collected sensor data and comparing the features to previously stored features. The map formed from the sensor data can indicate locations of traversable and non-traversable space within the environment. For example, locations of obstacles can be indicated on the map as non-traversable space, and locations of open floor space can be indicated on the map as traversable space.

The sensor data collected by any of the sensors can be stored in the memory 213. In addition, other data generated for the SLAM techniques, including mapping data forming the map, can be stored in the memory 213. These data produced during the mission can include persistent data that are produced during the mission and that are usable during further missions. In addition to storing the software for causing the robot 100 to perform its behaviors, the memory 213 can store data resulting from processing of the sensor data for access by the controller 212. For example, the map can be a map that is usable and updateable by the controller 212 of the robot 100 from one mission to another mission to navigate the robot 100 about the floor surface 50.

The persistent data, including the persistent map, helps to enable the robot 100 to efficiently clean the floor surface 50. For example, the map enables the controller 212 to direct the robot 100 toward open floor space and to avoid non-traversable space. In addition, for subsequent missions, the controller 212 can use the map to optimize paths taken during the missions to help plan navigation of the robot 100 through the environment 40.

Network Examples

Figure 4A:
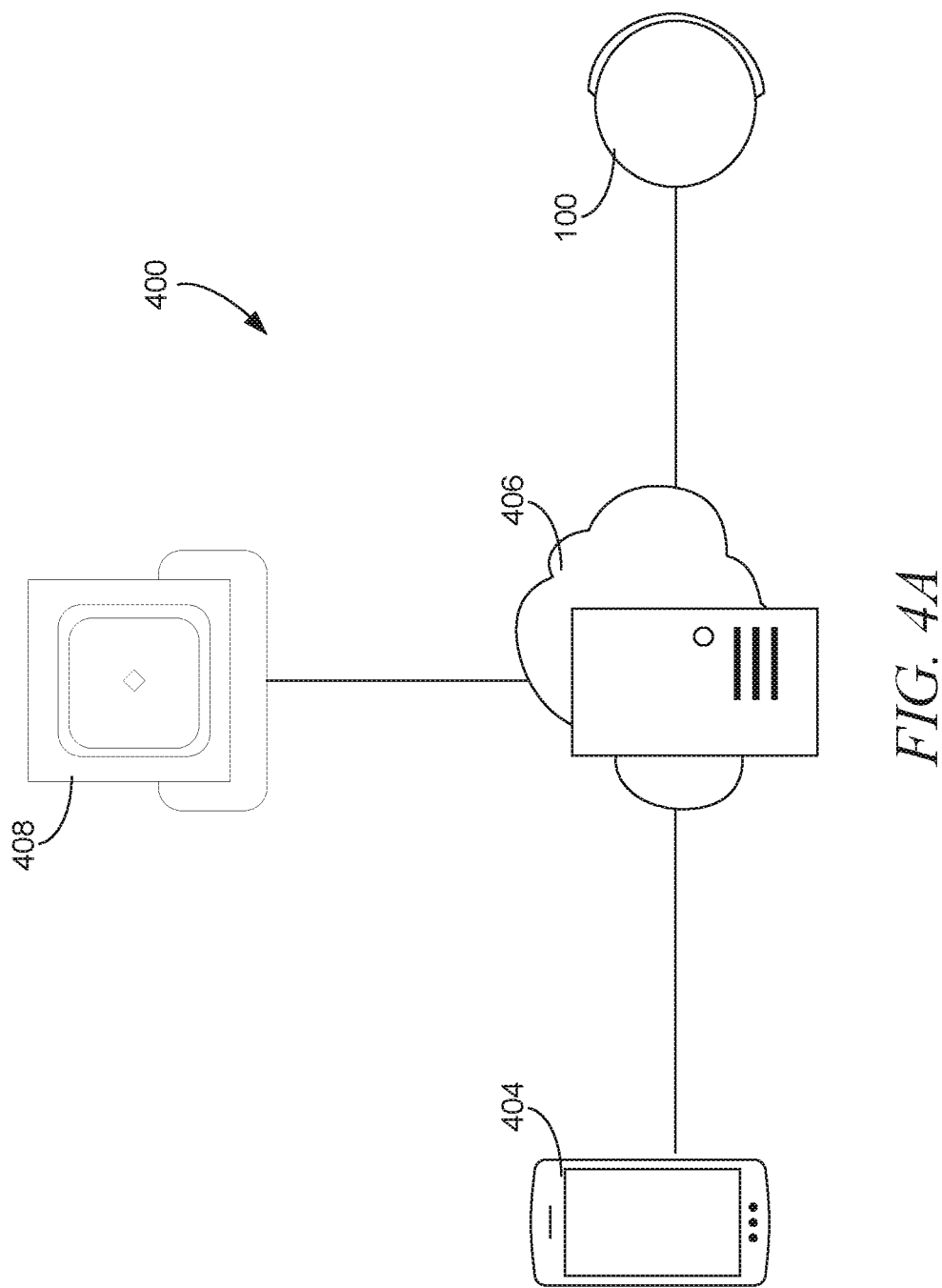
FIG. 4A illustrates a diagram illustrating an example of a communication network in which a mobile cleaning robot operates and data transmission in the network.

FIG. 4A is a diagram illustrating by way of example and not limitation a communication network 400 that enables networking between the mobile robot 100 and one or more other devices, such as a mobile device 404, a cloud computing system 406, or another autonomous robot 408 separate from the mobile robot 100. Using the communication network 410, the robot 100, the mobile device 404, the robot 408, and the cloud computing system 406 can communicate with one another to transmit and receive data from one another. In some examples, the robot 100, the robot 408, or both the robot 100 and the robot 408 communicate with the mobile device 404 through the cloud computing system 406. Alternatively, or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) can be employed by the communication network 410.

In some examples, the mobile device 404 can be a remote device that can be linked to the cloud computing system 406 and can enable a user to provide inputs. The mobile device 404 can include user input elements such as, for example, one or more of a touchscreen display, buttons, a microphone, a mouse, a keyboard, or other devices that respond to inputs provided by the user. The mobile device 404 can also include immersive media (e.g., virtual reality) with which the user can interact to provide input. The mobile device 404, in these examples, can be a virtual reality headset or a head-mounted display.

The user can provide inputs corresponding to commands for the mobile robot 404. In such cases, the mobile device 404 can transmit a signal to the cloud computing system 406 to cause the cloud computing system 406 to transmit a command signal to the mobile robot 100. In some implementations, the mobile device 404 can present augmented reality images. In some implementations, the mobile device 404 can be a smart phone, a laptop computer, a tablet computing device, or other mobile device.

According to some examples discussed herein, the mobile device 404 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment; adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 410 can include additional nodes. For example, nodes of the communication network 410 can include additional robots. Also, nodes of the communication network 410 can include network-connected devices that can generate information about the environment 40. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 410, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Figure 4B:
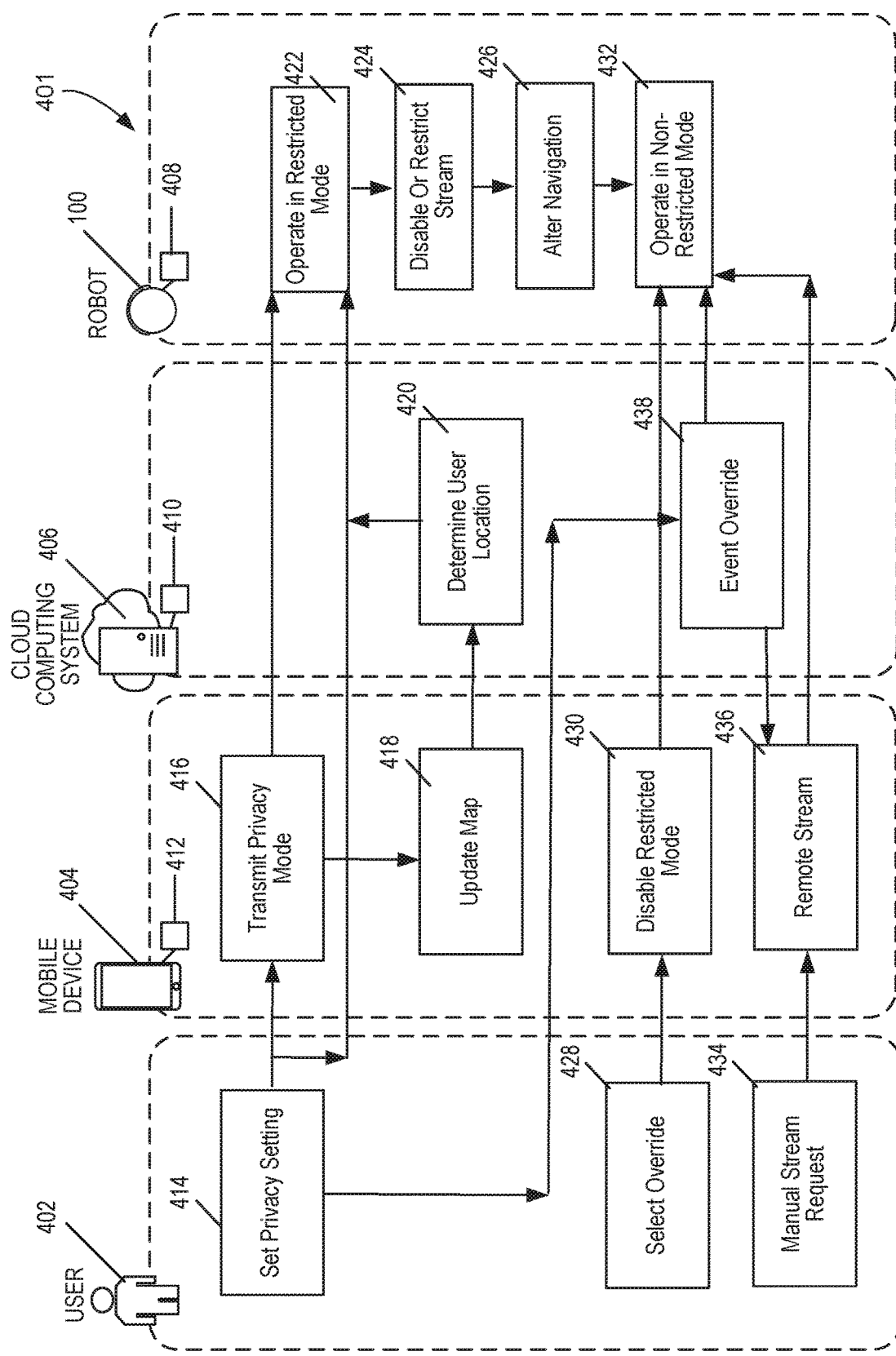
FIG. 4B illustrates a diagram illustrating an exemplary process of exchanging information between the mobile robot and other devices in a communication network.

FIG. 4B is a diagram illustrating an exemplary process 401 of exchanging information among devices in the communication network 410, including the mobile robot 100, the cloud computing system 406, and the mobile device 404.

In operation of some examples, a cleaning mission can be initiated by pressing a button on the mobile robot 100 (or the mobile device 404) or can be scheduled for a future time or day. The user can select a set of rooms to be cleaned during the cleaning mission or can instruct the robot to clean all rooms. The user can also select a set of cleaning parameters to be used in each room during the cleaning mission.

When desired, a user 402 can set a privacy setting 414 such as using an interface of the mobile device 404 or by directly interfacing with the robot 100 (such as the privacy button 148). Optionally, the privacy setting can be received via a voice or audio command from the user through the robot 100 (e.g., microphone) or through the mobile device 404 or through the network 406. The privacy setting can also be received via a voice or audio command through a mainstream voice interface connected to the network 406, to the robot 100, or to the mobile device 404. For example, a user could say "audio device, turn on cleaning robot privacy mode in the master bedroom" to enable the previously set privacy settings in the master bedroom. Optionally, the robot 100 or mobile device 404 can confirm receipt of the setting, such as using audio or text notifications.

When the mobile device 404 is used to receive the privacy instruction, the processor 412 of the mobile device 404 can transmit the instruction 416 to the robot 100 (such as through a controller of the robot 100) and optionally to the cloud computing system 406 (such as via a processor of the cloud 406).

The privacy mode or setting can also be used to update a map 418 of the environment of the robot 100 by the processor 412 of the mobile device or optionally using the cloud computing system 406 or the robot 100. For example, a room or a portion of a room can be marked as a privacy zone in the map, as discussed in further detail below. Optionally, a location of the user can be determined 420 such as by the cloud computing system 406. The location of the user can be determined using location of the mobile device (such as via a positioning system) 404 or through connectivity of the mobile device 404 to the robot 100, the user's home network, or other location indicator.

Depending on the location of the user 402, the map, a location of the robot 100 in the environment, and the privacy setting, the robot 100 can be instructed to operate in a restricted mode or a privacy mode. The specific operation in privacy mode can include various options, which can be defined (in part or in full) by the user 402. In one example, operation of the robot in a restricted mode can be restricting or disabling use of the camera (or image capture device) 424 of the robot. For example, an image stream of the camera can be deleted or discarded such as off a bit stream from the image capture device or using processing further downstream. Optionally, a mechanical shutter of the camera can be operated to close to obstruct all or a portion of a field of view of the camera.

Optionally, in a restricted mode, navigation of the robot 100 can be altered. For example, a robot can include a front-facing camera that can be used for navigation within an environment, such as using obstacle detection and avoidance (ODOA), visual simultaneous localization and mapping (VLSAM), or visual odometry (VO). When the restricted mode is enabled, the robot can operate without use (or with limited use) of the camera (and therefore without or with limited use of visual navigation functions).

Optionally, the user 402 can select an override mode 428, such as through the mobile device 404, an audio command to the robot 100, or through the cloud/network 406. The override can be transmitted to the mobile device 404 or the network 406 and to the robot 100. The override command can override all or part of a privacy setting to perform functions otherwise restricted by operation in the restricted mode, such as disabling or restricting the stream 424 whether the robot 100 is already operating in the restricted mode or is not operating in the restricted mode. Optionally, the override selection 428 can include or can be a manual consent option. Optionally, the manual consent or override option can present the user with options to override a portion of the restricted mode. For example, only the image stream can be restricted and audio capture can be unrestricted. Further examples are discussed below with respect to FIG. 6.

Optionally, at any time, the user 402 can select or create a manual stream request 434. The manual stream request can be transmitted to the mobile device 404, the cloud or network 406, or to the robot 100. When the manual stream request is received, the robot 100 can operate in a non-restricted mode 432. Optionally, the non-restricted mode can allow for the robot 100 to transmit the image stream or audio stream to the mobile device 436 for the user 402 to view or review the stream.

When the user creates or sets the privacy setting 414, the user can select or create an event override 438 that can be detected by the network or cloud 406, by the robot 100, or by the mobile device 404. The event can be, for example, a life event, a place or location event, or a thing event, as discussed in further detail below with respect to FIG. 5. Optionally, a list of events can be stored in the robot 100, in the mobile device 404, or the cloud or network 406. When the event is detected, the event override 438 can be enabled and the robot can operate in the non-restricted mode 432. Optionally, when the event override 438 is enabled, the video stream or audio stream can be streamed remotely 436 to the mobile device 404.

When the user selects the manual override, the robot 100 can optionally be navigated by the user to go to a desired location. For example, the user can select a location (and optionally an orientation) on a map of the environment to indicate to the robot to where the robot should navigate. Optionally, the user can use controls (e.g., forward, back, left, right), to help navigate the robot while the robot 100 moves to a location desired by the user. When the user selects an event-based override, the robot 100 can optionally navigate to a location of the event. For example, if the robot detects glass breaking (a thing event), the robot 100 can navigate to a location the robot 100 determines the event originated.

Figure 5A:
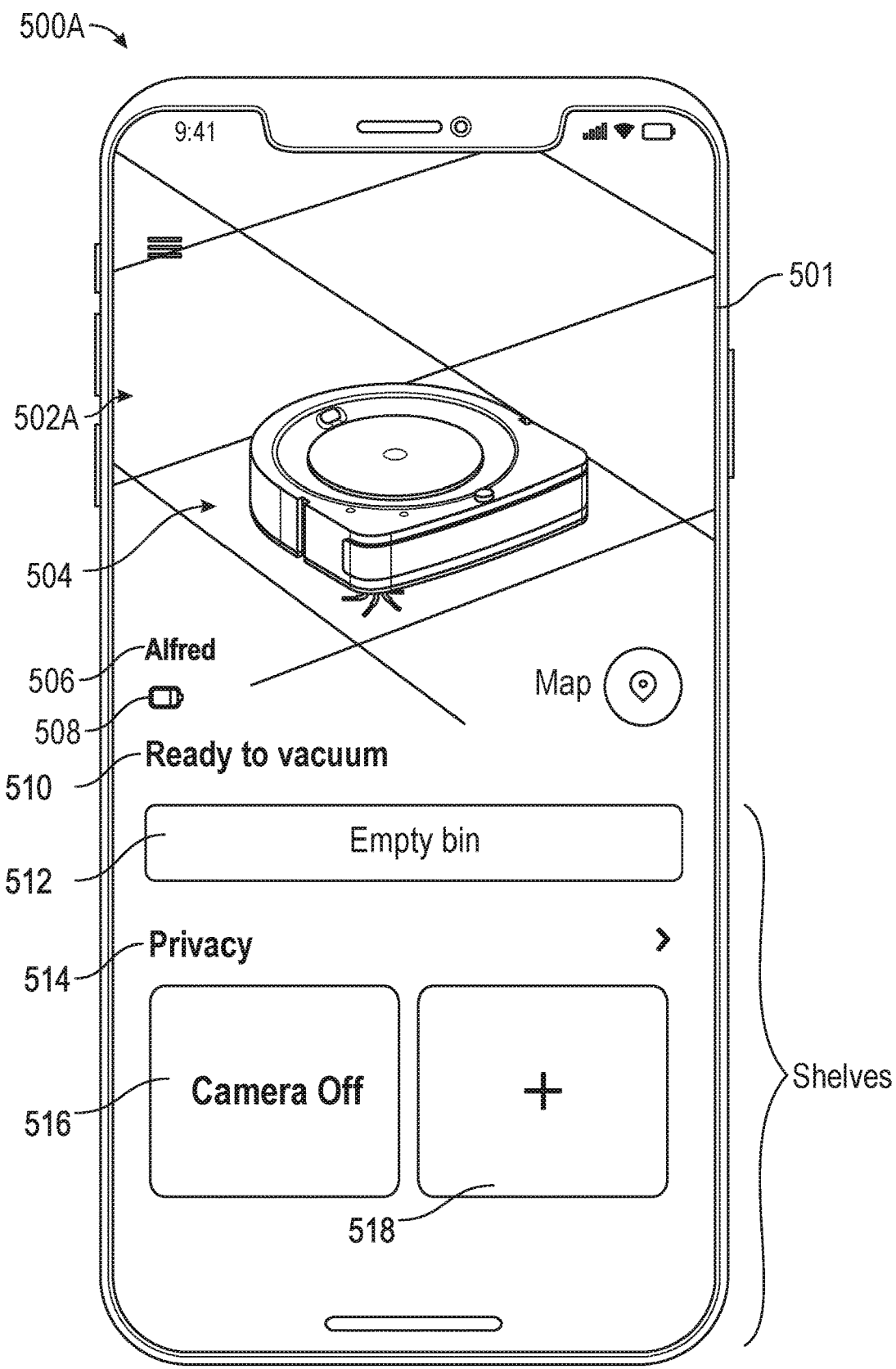
FIG. 5A illustrates a user interface of a handheld device for operating a mobile robot in an environment.
Figure 5B:
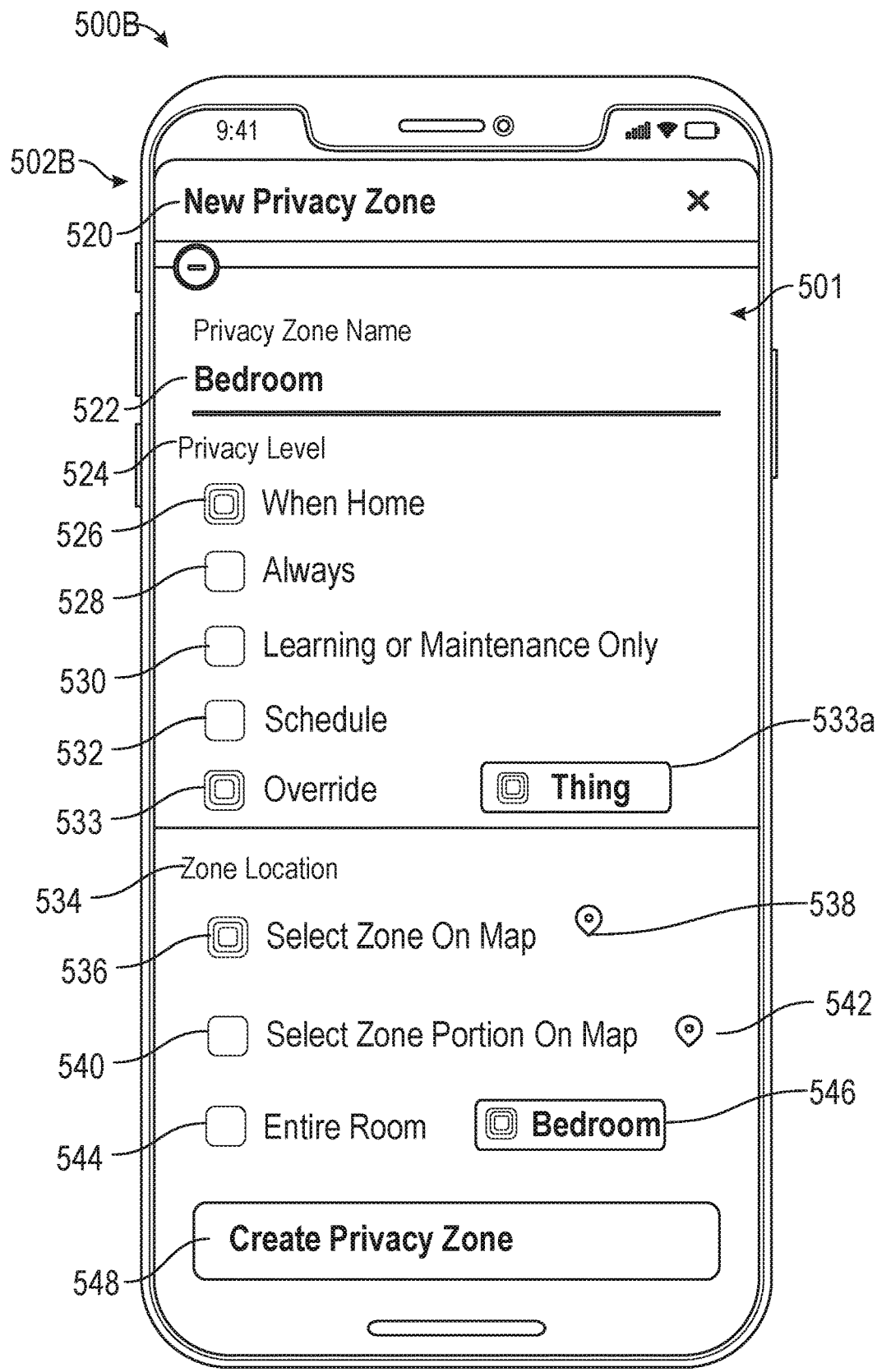
FIG. 5B illustrates a user interface of a handheld device for operating a mobile robot in an environment.
Figure 5C:
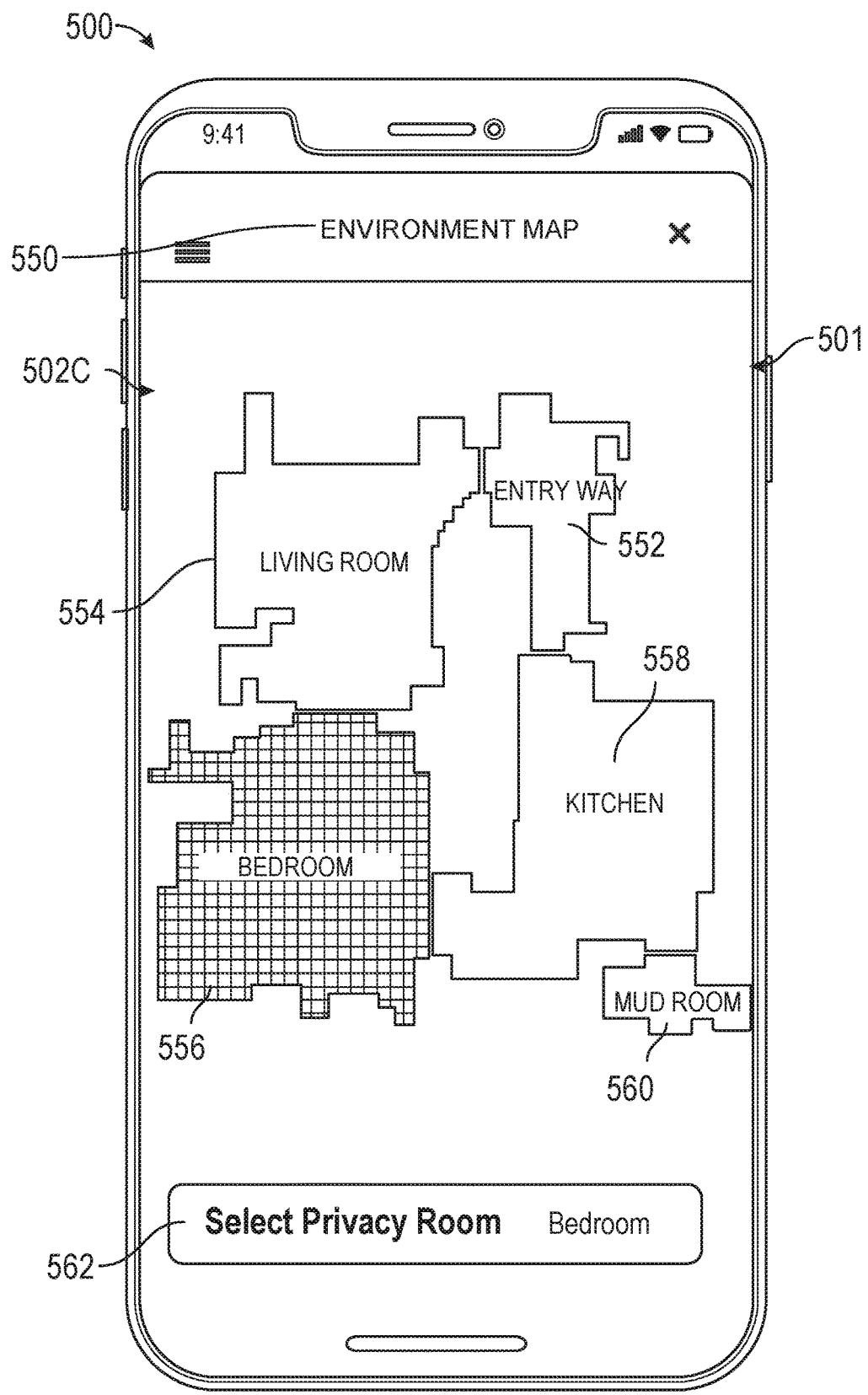
FIG. 5C illustrates a user interface of a handheld device for operating a mobile robot in an environment.
Figure 5D:
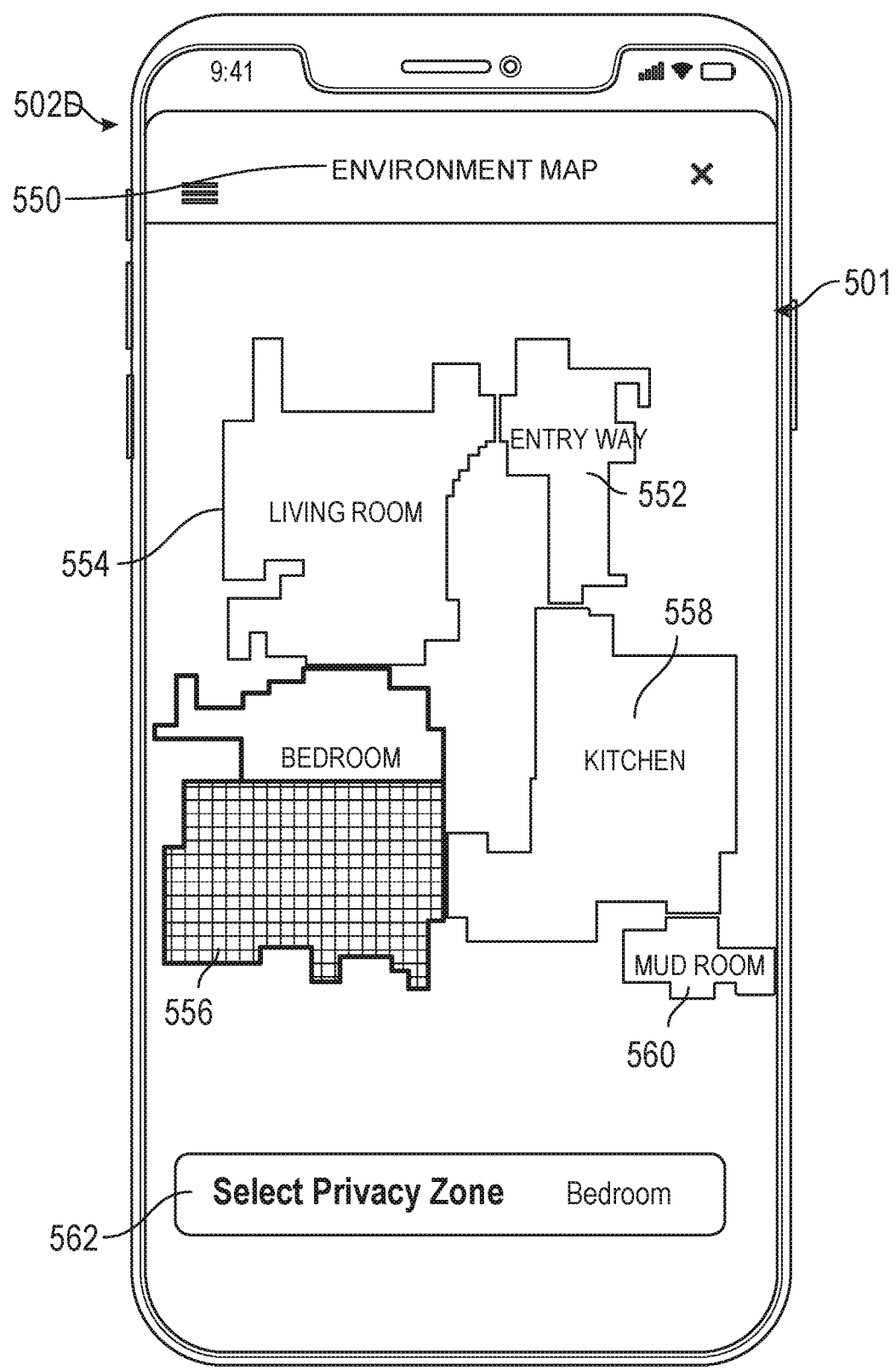
FIG. 5D illustrates a user interface of a handheld device for operating a mobile robot in an environment.
Figure 6:
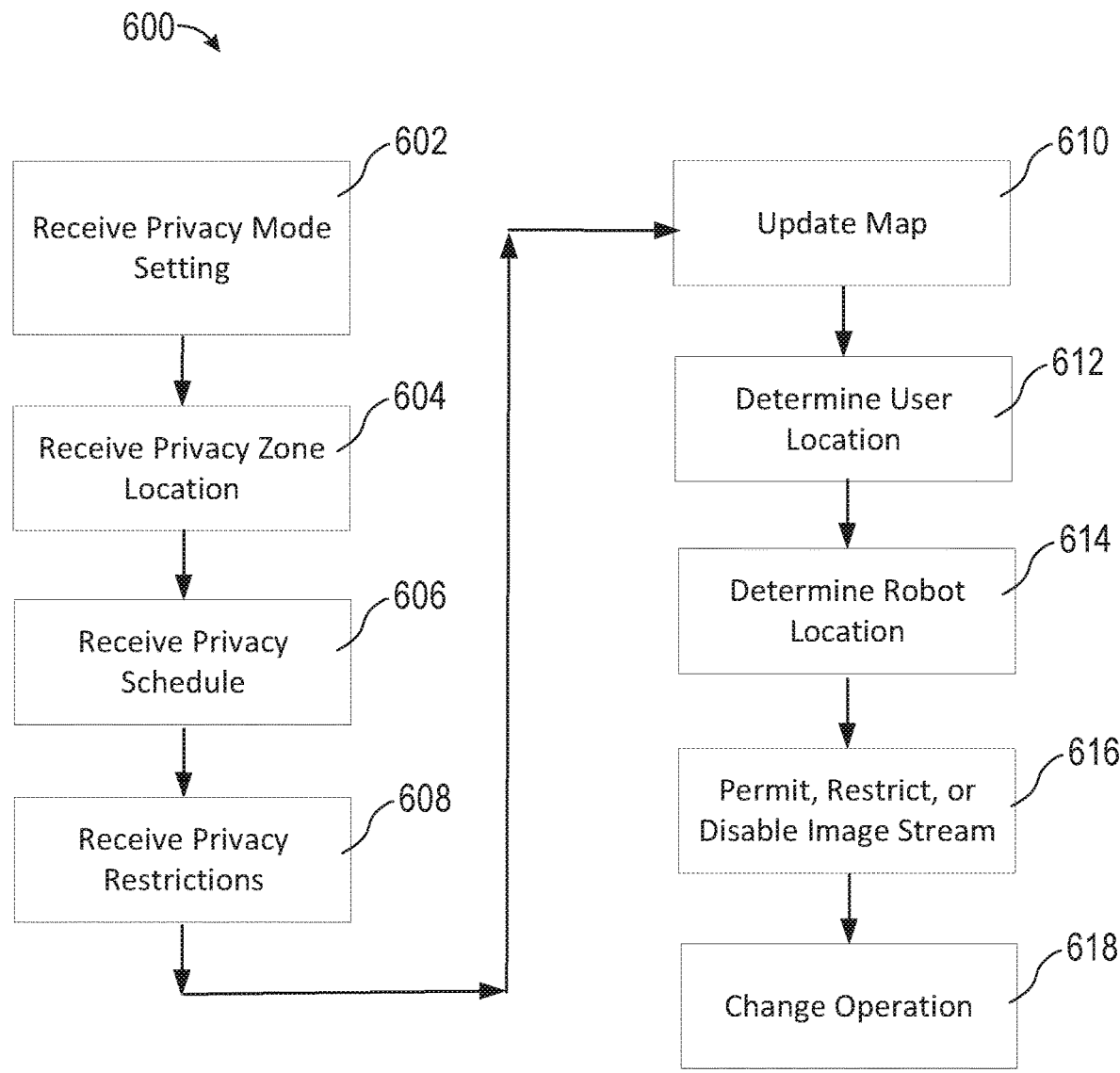
FIG. 6 illustrates a flow chart of operating a mobile cleaning robot.

Operations for the process 401 and other processes described herein, such as one or more steps discussed with respect to FIGS. 5A-6, can be executed in a distributed manner. For example, the cloud computing system 406, the mobile robot 100, and the mobile device 404 can execute one or more of the operations in concert with one another. Operations described as executed by one of the cloud computing system 406, the mobile robot 100, and the mobile device 404 can be, in some implementations, executed at least in part by two or all of the cloud computing system 406, the mobile robot 100, and the mobile device 404.

Optionally, privacy settings received by the mobile device 404 regarding the robot 100 can also be applied to the robot 408 or any other robot in communication with the network 406. For example, the settings can be applied to both a vacuuming robot and a mopping robot. Alternatively, privacy settings can be entered for different devices. In examples where other cameras are within the environment and are in communication with the network 406, the privacy settings for the robot 100 or 408 can be the master of privacy settings for the other cameras within the environment.

Privacy Control Examples

FIG. 5A illustrates a user interface 502A of a handheld device 500 for operating a mobile robot in an environment. The mobile robot can be the mobile clearing robot 100 discussed above and the environment can be the environment 40 or another environment.

The handheld device 500 can be a smart phone. In other examples, the handheld device can be a tablet, a laptop, a desktop computer, a handheld computer, a smartwatch, for example, or any other computing device including a processor, memory, and communication capabilities. The user interface 502A can be displayed on a display or screen 501 of the device 500.

In the example of FIG. 5A, the user interface 502A can display an image 504 representing the robot and the environment. The user interface 502A can also show a text indication 506 of a name of the robot and a battery indication 508 that can display a remaining battery charge of the robot. The user interface 502A can also show a selectable indication 512 that, when selected can transmit instructions to the robot to cause the robot to perform an indicated function. For example, when the indication 512 is selected, the device 500 can transmit instructions to the robot 100 to empty the debris bin of the robot 100. Such an indication can be one shelf of a series of shelves that can be displayed on the user interface 502A.

For example, the display can also show other selectable indications or shelves such as a privacy indication 514, a camera off indication 516, and an add privacy mode indication 518. In some examples, the privacy indication 514 can be selectable to change the user interface 502A to show privacy settings of the robot 100. Optionally, the privacy indication 514 can be selectable to change the display to show favorites other than privacy favorites. FIG. 5A shows that one privacy favorite can be the camera off indication 516 which can be selectable to turn off the camera of the robot. Other selectable camera and privacy indications can be displayed on the user interface 502A.

FIG. 5A also shows that the add indication 518 can be displayed. The add privacy indication 518 can be selectable to cause the device 500 to show a different display, such as the user interface 502B of FIG. 5B. The user interface 502B of FIG. 5B can also be accessed by selecting the privacy indication 514, through a selectable menu indication, a selectable settings indication, or the like.

FIG. 5B illustrates the user interface 502B of the handheld device 500, which shows a screen for creating or editing one or more privacy settings, such as privacy settings related to a camera or image capture device of a robot. The indication 520 can be an indication that a new privacy zone can be created or edited using the interface 502B. The title indication 522 can be selectable and editable to change a name of the privacy zone or setting. For example, a name Bedroom can be entered or optionally selected. Optionally, the name can be automatically selected and displayed based on a selection of a privacy zone. For example, when a bedroom zone is selected, as shown in FIG. 5C, the title indication 522 can display "Bedroom."

FIG. 5B also shows that the user interface 502B can display a privacy level 524. The privacy level can include one or more selectable indications for various privacy levels or settings. For example, a When Home indication 526 can be selectable to cause the device 500 to instruct the robot to operate the robot in a restricted mode or privacy mode any time the user is home. It can be determined when the user is home using connectivity of the device 500 to the robot, to the server, using location of the device 500, or the like.

Optionally, an Always indication 528 can be selectable to cause the device 500 to instruct the robot 100 to operate in a restricted mode or privacy mode always or at all times. That is, the camera or image capture device can be off or in a restricted mode at all times until the setting is changed.

A learning or maintenance only indication 530 can be also be selectable to cause the device 500 to instruct the robot 100 to operate in a restricted mode or privacy mode when the robot 100 is in doing maintenance or learning. That is, the camera or image capture device can be on only when the robot 100 is learning, such as learning the environment to create a map, update a map, or the like.

A schedule indication 532 can be also be selectable to cause the device 500 to instruct the robot 100 to operate in a restricted mode or privacy mode when the during specific times and days. The schedule can be received from the user from a calendar interface or can be manually input in various ways. In such a mode, the camera or image capture device can be on only when the calendar indicates that the camera can be on, such as when the user plans to be away from home.

An override indication 533 can be selectable or selected. For example, when a user desires to have an override to the privacy selection (e.g., When Home), the user can select the override indication 533. The override indication 533 can prompt the user to select one or more of a manual override or an event override. When a manual override is selected, the user can operate the robot 100 or the user interface to manually override all or some of the privacy settings. Optionally, the user can select which settings can be overridden using the manual override. For example, a user may opt to override the When Home setting, but may opt to not override a privacy zone or location setting (e.g., a bathroom). When the override is selected, the robot 100 can operate to capture video or audio, as discussed above with respect to FIG. 4.

When the user selects an event override, as shown in FIG. 5B, the user can be prompted with an event selection indication 533a. The user can use the event selection indication to select one or more events that, when detected by the robot 100, the network 406, or the device 500 (or 404), the other privacy settings can be overridden in part or in whole. For example, the user can be prompted (on the user interface 502, to select an event type, such as life, thing, or place event. Optionally, more than one type of event can be selected.

As shown in FIG. 5B, a thing event can be selected using the indication 533a. When the type of event is selected, a further indication can be presented where the user can select one or more events for the selected event type. Optionally or alternatively, the indication 533a can produce a list of events of all times that can be selected (one or more) by the user using the user interface 502. Events that can be listed are discussed in further detail below with regard to FIG. 6.

Optionally, more than one of the privacy level indications 524 can be selected. For example, the When Home indication 526 and the Schedule indication 532 can both be selected. In such an example, the device can send instructions to the robot 100 to cause the robot to operate in a restricted or privacy mode any time the user is home and according to a schedule selected by the user, such as every Saturday and Sunday, when the user expects to be home. Other privacy levels can be selectable as well. For example, a docking option can be selected to allow the camera to operate only while the robot 100 is docking.

A Zone Location indication 534 can present text to indicate a selected zone of the privacy setting. The zone location can be optionally chosen. For example, when the Always indication 528 is selected, and no rooms are selected, the robot 100 can operate in the restricted mode at all times throughout the environment. The same result can be accomplished by selecting all of the rooms of the environment for the privacy setting of Always.

A Select Zone on Map indication 536 can be selected to allow a user to select one or more rooms for the privacy zone. A map indication 538 can be selected to show the map and to choose one or more rooms, as shown in FIG. 5C. Similarly, a select Zone Portion on Map indication 540 can be selected to allow a user to select one or more room portions for the privacy zone, as shown in FIG. 5D. A map indication 542 can be selected to show the map and to choose one or more room portions. Optionally, an entire room indication 544 can be selected and a room indication 546 can be selected to choose a room. For example, selecting the room indication 546 can produce a drop-down list of rooms in the environment for selection. Optionally, more than one zone location can be selected. For example, an entire room can be selected in addition to a portion of another room.

A Create Privacy Zone indication 548 can be selectable when the settings are complete, which can cause the device 500 to transmit instructions of the privacy setting and location to the robot 100 so that the robot 100 can operate in the restricted mode when and how the user prefers.

Optionally, a range of privacy settings can be offered where the settings can be generalized. For example, Least, Medium, and Most privacy restriction options can be provided where an explanation of the levels is provided to the user without allowing the user to customize the settings. Optionally, each of the pre-designed (Good, Better, Best) settings can be default combinations of privacy settings and can be customized by the user. For example, the "Most" privacy setting can be an Always off instruction to the camera, but the user can create a custom version where the robot can use the camera in learning and maintenance modes when the user is not home. Optionally, the Least, Medium, and Most privacy restriction options can be to apply differing degrees of cryptographic masking or obfuscation (e.g., low, med, high) of the image stream based on the selected setting.

FIG. 5C illustrates a user interface 502C of the handheld device 500, which can display a map of the environment. The map can show an entry way indication 552, a living room indication 554, a bedroom indication 556, a kitchen indication 558, and a mud room indication 560. Each of the room indications can be representative of a room in the environment as produced by the robot 100 traversing the environment and collecting data to render the map.

Each room indication can be selectable to choose a room to which the privacy settings will apply. For example, the bedroom indication 556 can be selected. When selected, the bedroom indication can change color, pattern, or the like, to indicate, visually, that the bedroom indication 556 has been chosen. Optionally, multiple room indications can be chosen. When the room or rooms have been selected, A Select Privacy Room indication 562 can be selected to choose the selected room or rooms and return to the user interface screen 502B or optionally to complete the selection of the privacy settings.

FIG. 5D illustrates a user interface 502D of a handheld device for operating a mobile robot in an environment. The user interface 502D can be similar to the user interface 502C; the user interface 502D can differ in that the user interface 502D can allow a user to draw or otherwise select a portion of a zone or room. For example, the user can select a portion of the bedroom 556, which can include a bathroom and a bed, for example. The user interface 502D can allow the user to select multiple portions of multiple rooms or entire rooms, as desired. When the room portion or portions have been selected, a Select Privacy Room indication 562 can be selected to choose the selected portions and return to the user interface screen 502B or optionally to complete the selection of the privacy settings.

FIG. 6 illustrates a flow chart of operating a mobile cleaning robot. The method 600 can be a method of creating one or more privacy settings and operating a mobile cleaning robot in the privacy or restricted mode. The steps or operations of the method 1500 are illustrated in a particular order for convenience and clarity; many of the discussed operations can be performed in a different sequence or in parallel without materially impacting other operations. The method 600 as discussed includes operations performed by multiple different actors, devices, and/or systems. It is understood that subsets of the operations discussed in the method 600 can be attributable to a single actor, device, or system could be considered a separate standalone process or method.

The method 600 can begin at step 602 where a privacy mode setting can be received from a user interface. For example, the robot 100 can receive the privacy mode setting from the device 500 via the user interface 502. The privacy mode setting can be based on a user selection between at least two different privacy mode settings for determining whether to operate the mobile cleaning robot in an image-capture-restricted mode. For example, the privacy mode setting can be based on selection from any two or more of the options discussed with respect to FIGS. 4A-5D.

At step 604 a privacy zone location can be received, such as by the robot or by the device. For example, the device 500 can receive a privacy zone location through the use of the interface 502C. At step 606 a privacy schedule can be received, such as by the robot or by the device. For example, the device 500 can receive a privacy schedule through the use of the interface 502B. At step 608, privacy restrictions can be received. For example, one or more privacy settings can be received at the robot 100 or through the user device 500 via one or more of the user interfaces 502. Various or multiple restriction settings can be received.

For example, a setting can be received to disable the camera or the camera stream in a variety of ways, such as the camera stream can be disabled only when the user is home. Optionally, the stream can be disabled based on other events. For example, the stream can be disabled when the robot determines that an object is in the frame of the image capture device, where the object can be a person, animal, or other object. A setting can also be to restrict the image stream at all times except when the robot is in a learning or maintenance mode, such as when the map of the environment is created or needs to be updated.

Step 610 can optionally be performed to update a map of the environment. For example, the map can be updated to include or demark a privacy location or zone as provided by the user. For example, the user can use either of the user interfaces 502B-502D to select one or more privacy zones.

Once the privacy zones are received through the user interface 502, the environment map(s) can be updated to include the privacy zone(s).

At step 612, when the privacy settings are based on a location of a user, a location of the user can be determined. For example, it can be determined whether the user is in the environment or not in the environment, or whether the user (or users) is in a specific location within the environment. At step 614 a location of the robot can be determined. For example, a location of the robot 100 within the environment 40 can be determined, such as by using navigation and mapping algorithms of the robot.

At step 616, an image stream produced using an image capture device of the mobile cleaning robot can be produced in an absence of a user-selection of a more restrictive one of the privacy settings. That is, when the privacy settings are allow such as when there is no privacy restriction, the schedule allows for camera use, the user is not home, or the like, the image stream can be permitted to be created, analyzed, stored, or transmitted to the mobile device. The image stream still may not be transmitted outside the user's network without permission.

Also, at step 616, at least a portion of the image stream can be restricted or disabled based at least in part on a user-selection of a more restrictive one of the privacy settings. That is, when any privacy setting (such as any of those discussed above) is set or selected by a user the image stream produced by the camera or image capture device can be disrupted, restricted, disabled, or the like. Such restriction can be performed using various techniques.

For example, the camera can be powered off entirely. That is, a power supply to the camera can be stopped to stop the production of the image stream. Also, a shutter can be closed to obstruct part or all of the field of view of the image capture device. When the shutter is closed, the image stream can optionally be produced, but will be unusable for image processing. The field of view can be optionally blocked or obstructed using other devices or methods.

Optionally, the image stream can be manipulated by the processor or controller of the robot 100, such as when a user allows for partial images or parts of an image stream from the image capture device to be captured or processed. For example, when the restricted-image-capture mode (privacy or restricted mode) is enabled, the image stream can be produced by the image capture device and then blurred or pixelated by a controller or processor of the robot 100. The image stream can be partially blurred (e.g., background or detected object) or can be blurred entirely. The blurred image stream can optionally be used by the robot (or the controller thereof) for routines such as determining exposure settings and control.

Also, the image stream can be manipulated by chopping or cropping the frame. For example, when the restricted image capture mode is enabled, the image stream can be produced by the image capture device and then a portion of the frame can be removed by a controller or processor of the robot 100, such as the upper half (or upper two thirds, or the like) can be removed or deleted from the image stream. Then, the lower half (or remaining portion) can be used by the robot for visual navigation and operation that use only a bottom (or remaining) portion of the field of view or frame of the image stream, such as for visual odometry, obstacle detection, obstacle avoidance (optionally VO or ODOA), or the like.

When the user instructs the mobile cleaning robot to operate in the image-capture-restricted mode and to not store any portion of the image for some or all of the time, but the image capture device is not powered off or the field of view is not entirely obstructed, the robot 100 can process the image to erase all content. For example, the image stream can be deleted or discarded before the image stream is stored or is saved. Optionally, the image stream can be deleted or discarded immediately after it is saved or at a regular time interval (e.g., 2 seconds). For example, the image stream can be used to perform navigation and mapping analysis and can be discarded immediately after user in such processes. Such a delayed discard option can be selected by a user.

The mobile cleaning robot 100 (or processor or controller thereof) can operate the mobile cleaning robot 100 in the image-capture-restricted mode based at least at least in part on one or more of several conditions, determinations, or steps. For example, the mobile cleaning robot 100 can be operated in the image-capture-restricted mode based on the privacy schedule, such as a schedule set by the user or otherwise received by the robot 100 or the device 500.

The mobile cleaning robot 100 can be operated in the image-capture-restricted mode based on determining the location of the robot, such as when the robot location is located in a privacy zone, or such as when a location of the robot 100 is determined to be in a privacy zone indicated by a user as being a privacy zone on the map. The determination can be made based at least in part on the map, the privacy zone indication by the user, or the location of the robot 100 within the map.

The mobile cleaning robot 100 can be operated in the image-capture-restricted mode based at least at least in part on determining when a field of view of the image capture device includes at least a portion of the privacy zone. That is, the mobile cleaning robot can use the map or can use visual indications of where the robot is located and what is in the field of view of the camera of the robot. For example, the robot can reference the map or can use VSLAM to determine what is in the field of view of the camera or image capture device. When the robot 100 determines that a room that has a has a privacy restriction is in the field of view, even if the robot is in a different room, the robot can be operated in the image-capture-restricted mode.

The mobile cleaning robot 100 can be operated in the image-capture-restricted mode based at least at least in part on the user location. For example, the mobile cleaning robot 100 can determine a location of the user (e.g., within the environment or not) and can operate the robot 100 in the image-capture-restricted mode when the user is in the home. Also, the mobile cleaning robot 100 can detect a human occupant in the environment, such as by using the image stream (via obstacle detection), and can operate in the image-capture-restricted mode based at least at least in part on the detection.

Optionally, the robot 100 can interface with the user based on detection. For example, when the robot 100 detects an object that it is not certain is a restricted object (e.g., a human occupant or a phone bill on a refrigerator), the robot 100 can transmit a request to the mobile device 500 of the user to request that the user confirm whether or not that object is a restricted object.

When the mobile cleaning robot 100 is not operated in the image-capture-restricted mode, such as in an absence of a user-selection of a more restrictive one of the privacy settings, the robot 100 can navigate in the environment based at least in part on the image stream. When the robot is operated in the image-capture-restricted mode, such as based on a user-selection of a more restrictive one of the privacy settings, the robot 100 can navigate in an environment without use of the image stream. That is, the robot 100 can navigate without the use of the camera or image capture device and can navigate using at least one of an adjacency sensor, a contact sensor, an inertial sensor, a wall-following sensor, a cliff sensor, an odometry sensor, a gyroscope, or an accelerometer.

In a first example, the robot 100 can be operated in an image-capture-restricted mode where a first portion of the field of view (FOV) can be excluded from collection by the digital camera (e.g., FOV can be reduced by a number of degrees in the vertical direction or by a number of degrees in both the horizontal and vertical directions—the number of degrees can be in a range from 0-5 degrees, 3-10 degrees, 5-15 degrees, etc.). In the first example, the robot 100 can operate in a first modified form of navigation with a reduced reliance upon visual landmarks (e.g., does not rely upon visual landmarks that are no longer accessible in the first example due to the reduction in FOV).

In a second example, the robot 100 can be operated in an image-capture-restricted mode where a second portion of the FOV can be excluded from collection by the digital camera. For example, the FOV can be further reduced by a number of degrees in the vertical direction or by a number of degrees in both the horizontal and vertical directions—the number of degrees can be in a range from 0-5 degrees, 3-10 degrees, 5-15 degrees, etc.). In the second example, the robot 100 can operate in a second modified form of navigation with a further reduced reliance upon visual landmarks (e.g., does not rely upon visual landmarks that are no longer accessible in the second example due to the reduction in FOV).

In a third example, the robot 100 can be operated in an image-capture-restricted mode where a portion of the FOV is inaccessible such that landmarks are no longer accessible or viewable. In such an example, ODOA and VO can still be performed, such as by using a lower portion of the FOV.

In a fourth example, the robot 100 can be operated in an image-capture restricted mode where the image stream is not produced, is discarded, or the like In such an example, the robot 100 can perform navigation based entirely on non-visual landmarks, such as use of a map together with positioning information, wheel encoders, downward oriented optical tracking sensors, or the like.

Optionally, in addition to manipulating video or image streams based on user selected settings, audio collected by the robot can similarly be limited. For example, the user can select settings for capturing and not capturing audio through the robot 100. The settings for audio collection can be the same as the settings for the image capture device or the settings for the audio collection can be different from the video settings.

Capture of audio by the robot 100 can be based on various events, such as detected images, locations, schedules, or the like. For example, the robot 100 can capture audio only when a privacy schedule allows for the capture of audio. Also, the robot 100 can capture audio when the robot 100 is in particular rooms or zones. For example, the robot 100 can capture audio throughout an environment except for when the robot 100 is located in a privacy room or zone where audio capture is not permitted.

Optionally, audio can be captured or not captured when the robot 100 determines (or is notified) that the robot 100 is near a particular individual. For example, the privacy settings can indicate a person or persons who, when determined to be near the environment (or near the robot 100 or in the same room or zone), should cause the robot 100 to not capture or record audio.

In another example, audio can be filtered by the robot 100. For example, audio can be filtered when the robot 100 determines (or is notified) that the robot 100 is near a particular individual. For example, the privacy settings can indicate a person or persons who, when determined to be near the environment (or near the robot 100 or in the same room or zone), should cause the robot 100 to not filter out the voices of such persons. The filtering can be done via voice recognition or the audio can filter all noises determined to be human speech around an identified individual. Optionally, certain frequency ranges can be filtered.

Optionally, in the method 600 (or in any of the methods or sequences discussed above), the user can be presented with a manual override option, as discussed above with respect to FIG. 4. Selection of an override can allow the robot 100 to operate in the non-restricted (or normal) mode when the override is selected and transmitted to the robot 100.

Optionally, the override can be selected by the user (such as through a privacy setting using the interface 502B of FIG. 5. During such a selection, the user can select an event response override or an override that can occur automatically based on detection of an event by the robot 100, by the mobile device (500 or 404), or by the network 406. The override can be implemented by the robot 100 based on a life event, a place event, or location event, or a thing event.

A life event can be a detection by the robot 100 (or the mobile device 404 or the network 406) that: a human is speaking, a human is yelling, a human is crying, a dog is barking, a cat is meowing, a parrot is talking, or the like. A place or location event can be a detection by the robot 100 (or the mobile device 404 or the network 406) where: the robot 100 is instructed to patrol a room or rooms, the presence of water is detected (such as by the robot 100 on the floor), a temperature of the environment is determined to be above or below a threshold (such as by the robot 100), or a humidity of the environment is determined to be above or below a threshold (such as by the robot 100). A thing event can be a determination by the robot 100 (or the mobile device 404 or the network 406) that: a loud noise is detected, glass breaking is detected, a fire alarm is detected, a carbon dioxide alarm is detected, a television is on, a radio is on, a door is opened or closed, a cabinet is closed, water is running from a sink or toilet, an appliance is producing an alarm, a security alarm is on, a knock at a door, a doorbell, or the like.

When such an event (life, location, or thing) is detected or determined by the robot 100 (or mobile device 404 or network 406 or combination), all or a portion of the restricted mode can be disabled and the robot can operate in the non-restricted mode or a partially restricted mode.

Optionally, when such an event (life, location, or thing) is detected or determined by the robot 100, the robot 100 can operate in an reconnaissance or information gathering mode where the robot 100 can temporarily ignore its mission or routine to gather additional information about the event. For example, the robot 100 can travel to the location of the detected noise or image to further capture audio or video about the detected event. For example, if the robot 100 detects glass breaking, the robot 100 can travel to the area to gather additional video or audio information that can be transmitted to the mobile device 404 (or 500) or the network 406.

Notes and Examples

The following, non-limiting examples, detail certain aspects of the present subject matter to solve the challenges and provide the benefits discussed herein, among others.

Example 1 is a method of operating a mobile cleaning robot, the method comprising: receiving a privacy mode setting from a user interface, the privacy mode setting based on a user selection between at least two different privacy mode settings for determining whether to operate the mobile cleaning robot in an image-capture-restricted mode; permitting an image stream using an image capture device of the mobile cleaning robot in an absence of a user-selection of a more restrictive one of the privacy settings; and restricting or disabling at least a portion of the image stream based at least in part on a user-selection of a more restrictive one of the privacy settings.

In Example 2, the subject matter of Example 1 optionally includes determining a robot location of the mobile cleaning robot in an environment; and operating the mobile cleaning robot in the image-capture-restricted mode based at least in part on the robot location.

In Example 3, the subject matter of Example 2 optionally includes receiving a privacy zone location; and operating the mobile cleaning robot in the image-capture-restricted mode based at least in part on determining when the robot location is located in the privacy zone.

In Example 4, the subject matter of Example 3 optionally includes updating a map of the environment to include the privacy zone location; and operating the mobile cleaning robot in the image-capture-restricted mode based at least at least in part on determining when the robot location is located in the privacy zone using the map of the environment.

In Example 5, the subject matter of any one or more of Examples 2-4 optionally include receiving a privacy zone location; and operating the mobile cleaning robot in the image-capture-restricted mode based at least at least in part on determining when a field of view of the image capture device includes at least a portion of the privacy zone.

In Example 6, the subject matter of any one or more of Examples 1-5 optionally include determining a user location of a user; and operating the mobile cleaning robot in the image-capture-restricted mode based at least at least in part on the user location.

In Example 7, the subject matter of any one or more of Examples 1-6 optionally include detecting, using the image stream, a human occupant in the environment; and operating the mobile cleaning robot in the image-capture-restricted mode when the human occupant is detected.

In Example 8, the subject matter of any one or more of Examples 1-7 optionally include receiving a privacy schedule; and operating the mobile cleaning robot in the image-capture-restricted mode based at least at least in part on the privacy schedule.

In Example 9, the subject matter of Example 8 optionally includes determining a user location of a user; and operating the mobile cleaning robot in the image-capture-restricted mode based at least at least in part on the user location and the privacy schedule.

In Example 10, the subject matter of any one or more of Examples 1-9 optionally include navigating the mobile cleaning robot in an environment based at least in part on the image stream in an absence of a user-selection of a more restrictive one of the privacy settings.

In Example 11, the subject matter of Example 10 optionally includes navigating the mobile cleaning robot in an environment without use of the image stream based at least in part on a user-selection of a more restrictive one of the privacy settings.

In Example 12, the subject matter of Example 11 optionally includes wherein navigating the mobile cleaning robot in an environment without use of the image stream based at least in part on a user-selection of a more restrictive one of the privacy settings includes navigating using at least one of an adjacency sensor, a contact sensor, an inertial sensor, a wall-following sensor, a depth sensor, a cliff sensor, an odometry sensor, a gyroscope, or an accelerometer.

In Example 13, the subject matter of any one or more of Examples 1-12 optionally include wherein operating the mobile cleaning robot in the image-capture-restricted mode includes adjusting a mechanical shutter of the mobile cleaning robot to obstruct at least a portion of a field of view of the image capture device.

In Example 14, the subject matter of any one or more of Examples 1-13 optionally include wherein operating the mobile cleaning robot in the image-capture-restricted mode includes disabling power to the image capture device.

In Example 15, the subject matter of any one or more of Examples 1-14 optionally include wherein operating the mobile cleaning robot in the image-capture-restricted mode includes discarding at least a portion of the image capture stream before the at least a portion of the image capture stream is stored.

In Example 16, the subject matter of any one or more of Examples 1-15 optionally include wherein the privacy mode setting is provided using a user interface on the mobile cleaning robot.

Example 17 is a machine-readable medium including instructions for operating a mobile cleaning robot, which when executed by a processor, cause the processor to: receive a privacy mode setting from a user interface, the privacy mode setting based on a user selection between at least two different privacy mode settings to determine whether to operate the mobile cleaning robot in an image-capture-restricted mode; permit an image stream using an image capture device of the mobile cleaning robot in an absence of a user-selection of a more restrictive one of the privacy settings; and restrict or disable at least a portion of the image stream based at least in part on a user-selection of a more restrictive one of the privacy settings.

In Example 18, the subject matter of Example 17 optionally includes instructions that cause the processor to: determine a robot location of the mobile cleaning robot in an environment; and operate the mobile cleaning robot in the image-capture-restricted mode based at least in part on the robot location.

In Example 19, the subject matter of Example 18 optionally includes instructions that cause the processor to: receive a privacy zone location; and operate the mobile cleaning robot in the image-capture-restricted mode based at least in part on the determination of when the robot location is located in the privacy zone.

In Example 20, the subject matter of Example 19 optionally includes instructions that cause the processor to: update a map of the environment to include the privacy zone location; and operate the mobile cleaning robot in the image-capture-restricted mode based at least at least in part on the determination of when the robot location is located in the privacy zone using the map of the environment.

Example 21 is a method of operating a mobile cleaning robot, the method comprising: receiving, based on a user selection via a user interface, a privacy mode setting for operating the mobile cleaning robot; permitting an image stream using an image capture device of the mobile cleaning robot based at least in part on the privacy mode setting; and operating the mobile cleaning robot in a restricted mode based at least in part on the privacy mode setting, operation including controlling at least a portion of the image stream based at least in part on the privacy mode setting.

In Example 22, the subject matter of Example 21 optionally includes navigating the mobile cleaning robot in an environment based at least in part on the image stream in an absence of a user-selection of a more restrictive one of the privacy settings.

In Example 23, the subject matter of Example 22 optionally includes navigating the mobile cleaning robot in an environment without use of the image stream based at least in part on a user-selection of a more restrictive one of the privacy settings.

Example 24 is a method of operating a mobile cleaning robot, the method comprising: producing an image stream using an image capture device of the mobile cleaning robot; navigating the mobile cleaning robot in an environment based at least in part on the image stream; receiving an instruction to disable the image stream; and disabling at least a portion of the image stream of the image capture device.

In Example 25, the apparatuses, systems, or methods of any one or any combination of Examples 1-24 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of operating a mobile cleaning robot, the method comprising:
   receiving a privacy mode setting from a user interface, the privacy mode setting based on a user selection between at least two different privacy mode settings for determining, by a processor, whether to operate the mobile cleaning robot in an image-capture-restricted mode;
   permitting an image stream using an image capture device of the mobile cleaning robot in an absence of a user-selection of a more restrictive one of the privacy settings; and
   restricting or disabling at least a portion of the image stream based at least in part on a user-selection of a more restrictive one of the privacy settings.

2. The method of claim 1, further comprising:
   determining a robot location of the mobile cleaning robot in an environment; and
   operating the mobile cleaning robot in the image-capture-restricted mode based at least in part on the robot location.

3. The method of claim 2, further comprising:
   receiving a privacy zone location; and
   operating the mobile cleaning robot in the image-capture-restricted mode based at least in part on determining when the robot location is located in the privacy zone.

4. The method of claim 3, further comprising:
   updating a map of the environment to include the privacy zone location; and
   operating the mobile cleaning robot in the image-capture-restricted mode based at least at least in part on determining when the robot location is located in the privacy zone using the map of the environment.

5. The method of claim 2, further comprising:
   receiving a privacy zone location; and
   operating the mobile cleaning robot in the image-capture-restricted mode based at least at least in part on determining when a field of view of the image capture device includes at least a portion of the privacy zone.

6. The method of claim 1, further comprising:
   determining a user location of a user; and
   operating the mobile cleaning robot in the image-capture-restricted mode based at least at least in part on the user location.

7. The method of claim 1, further comprising:
   detecting, using the image stream, a human occupant in an environment; and
   operating the mobile cleaning robot in the image-capture-restricted mode when the human occupant is detected.

8. The method of claim 1, further comprising:
   receiving a privacy schedule; and
   operating the mobile cleaning robot in the image-capture-restricted mode based at least at least in part on the privacy schedule.

9. The method of claim 8, further comprising:
   determining a user location of a user; and
   operating the mobile cleaning robot in the image-capture-restricted mode based at least at least in part on the user location and the privacy schedule.

10. The method of claim 1, further comprising:
    navigating the mobile cleaning robot in an environment based at least in part on the image stream in an absence of a user-selection of a more restrictive one of the privacy settings.

11. The method of claim 10, further comprising:
navigating the mobile cleaning robot in an environment without use of the image stream based at least in part on a user-selection of a more restrictive one of the privacy settings.

12. The method of claim 11, wherein navigating the mobile cleaning robot in an environment without use of the image stream based at least in part on a user-selection of a more restrictive one of the privacy settings includes navigating using at least one of an adjacency sensor, a contact sensor, an inertial sensor, a depth sensor, a wall-following sensor, a cliff sensor, an odometry sensor, a gyroscope, or an accelerometer.

13. The method of claim 1, wherein operating the mobile cleaning robot in the image-capture-restricted mode includes adjusting a mechanical shutter of the mobile cleaning robot to obstruct at least a portion of a field of view of the image capture device.

14. The method of claim 1, wherein operating the mobile cleaning robot in the image-capture-restricted mode includes disabling power to the image capture device.

15. The method of claim 1, wherein operating the mobile cleaning robot in the image-capture-restricted mode includes discarding at least a portion of the image capture stream before the at least a portion of the image capture stream is stored.

16. The method of claim 1, wherein the privacy mode setting is provided using a user interface on the mobile cleaning robot.

17. A machine-readable medium including instructions for operating a mobile cleaning robot, which when executed by a processor, cause the processor to:
receive a privacy mode setting from a user interface, the privacy mode setting based on a user selection between at least two different privacy mode settings to determine whether to operate the mobile cleaning robot in an image-capture-restricted mode;
permit an image stream using an image capture device of the mobile cleaning robot in an absence of a user-selection of a more restrictive one of the privacy settings; and
restrict or disable at least a portion of the image stream based at least in part on a user-selection of a more restrictive one of the privacy settings.

18. The machine-readable medium of claim 17, further comprising instructions that cause the processor to:
determine a robot location of the mobile cleaning robot in an environment; and
operate the mobile cleaning robot in the image-capture-restricted mode based at least in part on the robot location.

19. The machine-readable medium of claim 18, further comprising instructions that cause the processor to:
receive a privacy zone location; and
operate the mobile cleaning robot in the image-capture-restricted mode based at least in part on the determination of when the robot location is located in the privacy zone.

20. The machine-readable medium of claim 19, further comprising instructions that cause the processor to:
update a map of the environment to include the privacy zone location; and
operate the mobile cleaning robot in the image-capture-restricted mode based at least at least in part on the determination of when the robot location is located in the privacy zone using the map of the environment.

* * * * *